United States Patent
Sato

(10) Patent No.: US 6,667,749 B2
(45) Date of Patent: *Dec. 23, 2003

(54) USER INTERFACE SYSTEM HAVING A SEPARATE MENU FLOW SOFTWARE OBJECT AND OPERATION SOFTWARE OBJECT

(75) Inventor: Fumihiko Sato, Machida (JP)

(73) Assignee: Ricoh Company, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/373,739

(22) Filed: Aug. 13, 1999

(65) Prior Publication Data

US 2003/0058282 A1 Mar. 27, 2003

(30) Foreign Application Priority Data

Aug. 13, 1998 (JP) ............................................. 10-229037

(51) Int. Cl.$^7$ ................................ G09G 5/00; G06F 9/46
(52) U.S. Cl. ........................ 345/762; 709/316; 345/810
(58) Field of Search ................................ 345/825, 826, 345/762, 810

(56) References Cited

U.S. PATENT DOCUMENTS 5,596,702 A * 1/1997 Stucka et al. ............... 345/746

* cited by examiner

Primary Examiner—John Cabeca
Assistant Examiner—Brian Detwiler
(74) Attorney, Agent, or Firm—Oblon, Spivak, McClelland, Maier & Neustadt, P.C.

(57) ABSTRACT

A user interface system, computer program product, and method for displaying an operation menu and transferring the contents thereof based on an operation input received in response to operation menu selection. The display and transfer of the operation menu are achieved using a group of independent software objects that include a menu flow software object that controls the transfer of the contents of the operation menu and a separate operation software object that functions in cooperation with the menu flow software object to control processing of the operation input by a processor. The operation software object includes an operational information memorizing object for storage of the operation software object contents and a separate operation controlling object functioning in cooperation with the operational information memorizing object to create, change, and delete the input operation.

8 Claims, 4 Drawing Sheets

USER INTERFACE SYSTEM HAVING A SEPARATE MENU FLOW SOFTWARE OBJECT AND OPERATION SOFTWARE OBJECT

BACKGROUND OF THE INVENTION

1. Field of the Invention

The present invention relates to a user interface system, in particular, a user interface including multiple independent software parts, in which, by the cooperation of the multiple independent software parts, an operation menu is displayed and the contents of the displayed operation menu are transferred in accordance with the operation of selecting the operation menu. A processing requirement designated by the operation input is understood and practiced from the operation menu thus displayed, and thereby, the system information of said user interface apparatus is displayed.

2. Discussion of the Background

In recent years, computer hardware efficiency has improved, and the low cost of the hardware as fallen. Also, the scale of software has increased, and the extent of the complicated problems to be solved have steadily grown year by year.

On the other hand, there is a tendency that the research and development cycle of the software goods or the merchandise assembled with those software goods has shortened year by year. In such an environment, the development efficiency in the software industry must improve.

One of the methods of solving such problems as mentioned above is to create separate parts of the software. In such method, a software system is constructed with plural independent software parts, and the software parts thus constructed are reused in another software system per a unit of such software part. Thereby, the efficiency of the development of medium and long range software can be further improved.

On the other hand, there arises a problem peculiar to the area of such problems in the user interface apparatus of a facsimile device, etc. Namely, the property of the user interface software and the control method thereof are not separated from each other. As the result, when a change in the operation flow occurs by changing the application, the software for controlling the operation flow cannot be applied to the above-mentioned user interface. Therefore, the software cannot be reused after changing the application.

For this reason, in spite of the fact that the operation flow is constructed with the menu and the transferring thereof, it is necessary to update or develop a new software for both the controlling side and the controlled side in the software.

Furthermore, even though the user interface includes similar control systems, the respective software programs are not separated from each other. Therefore, it is necessary to prepare program codes that closely resemble one another for the respective control systems.

Even though the user interface is constructed such that the common parts of the software programs are formed in a module and the respective parts are called out, the calling of respective parts further complicates matters. Additionally, modules not valuable for reuse tend to be created. For this reason, it is necessary to develop different program codes event if the new user interface has an operation and structure very similar to the older user interface.

Heretofore, the background art regarding the user interface has been described. However, according to such background art, there exists no advantageous functional effect for the user interface as mentioned above.

SUMMARY OF THE INVENTION

It is therefore an object of the present invention to solve the problems of the background art as mentioned heretofore.

It is another object of the present invention to provide a user interface capable of easily reusing software objects.

It is still another object of the present invention to provide a user interface including plural independent software objects, in which, by the cooperation of the plural independent software objects, an operation menu is displayed. The contents of the displayed operation menu are transferred in accordance with the operation of selecting the operation menu, and a processing requirement designated by the operation input is understood and practiced from the operation menu thus displayed. Thereby, the system information of the user interface apparatus is displayed.

It is still another object of the present invention to provide a method of reusing the software objects in the user interface apparatus.

It is still another object of the present invention to provide a method of realizing a user interface system including the steps of displaying an operation menu, transferring the contents of the displayed operation menu in accordance with the operation of selecting the operation menu, understanding and practicing a processing requirement designated by the operation input from the displayed operation menu, and thereby display the system information of the user interface apparatus.

In order to solve the aforementioned subject matter, according to a first aspect of the present invention, a user interface system includes plural independent software objects.

By the cooperation of the plural independent software objects, an operation menu is displayed and the contents of the displayed operation menu are transferred in accordance with the operation of selecting the operation menu. A processing requirement designated by the operation input is understood and practiced from said operation menu thus displayed, and thereby the system information of said user interface apparatus is displayed. In the user interface apparatus, a menu flow part serving as a first software object for controlling the transferring of the operation menu and an operation object serving as a second software object for controlling the operation input are constructed as independent objects in cooperation with each other.

According to a second aspect of the present invention, the menu flow object includes of a flow information object serving as a third software object for capturing the transferring of the menu as a static information and a flow control object serving as a fourth software object for deciding the transferring of the menu in accordance with the operation of selecting the menu, both of which are the independent object cooperating with each other.

According to a third aspect of the present invention, the operation object includes of an operational information memorizing object serving as a fifth software object for memorizing the contents of the operation and an operation controlling object serving as an object for registering, changing, and deleting the inputted operation, both of which are independent objects cooperating with each other.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Figure 1:
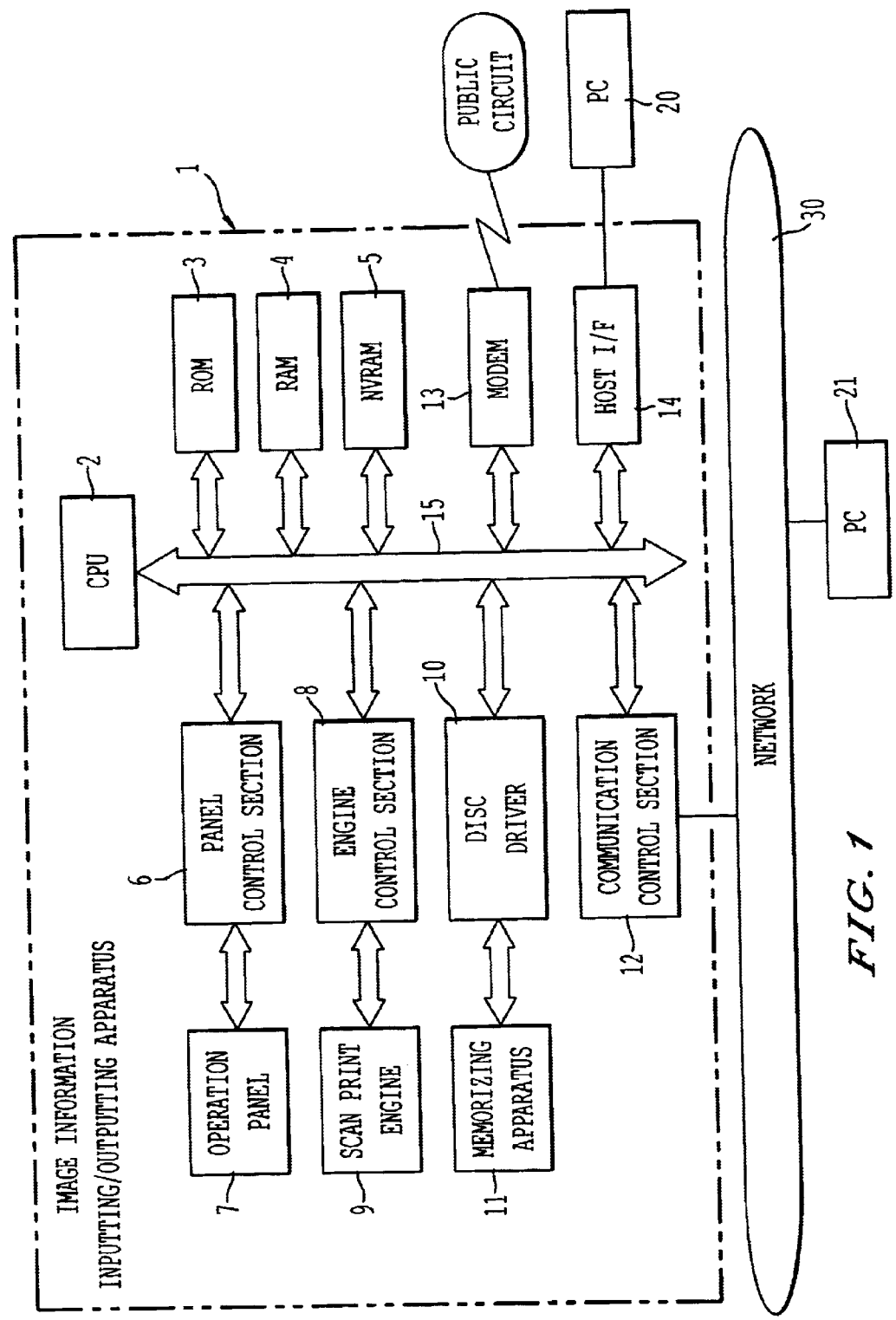
FIG. 1 is a block diagram illustrating an overall hardware structure of an image information inputting/outputting apparatus to which the user interface according to the present invention can be applied.

In describing the preferred embodiment of the present invention illustrated in the drawings, specific terminology is employed for the sake of clarity. However, the present invention is not intended to be limited to the specific terminology so selected, and it is to be understood that each specific element includes all technical equivalents which operate in a similar manner.

Referring now to the drawings, wherein like reference numerals designate identical or corresponding parts throughout the several views, and more particularly to FIG. 1 thereof, a block diagram illustrating an overall hardware structure of an image information inputting/outputting apparatus 1 is shown. The user interface according to the present invention can be applied to the image information inputting/outputting apparatus 1.

The hardware construction of the image information inputting/outputting apparatus 1, to which the user interface relating to the embodiment of the present invention can be applied, is illustrated in FIG. 1. In FIG. 1, the image information inputting/outputting apparatus 1 includes a CPU 2, a ROM 3, a RAM 4, an NVRAM 5, a panel control section 6, an operation panel 7, an engine control section 8, a scan print engine 9, a disc driver 10, a memorizing apparatus 11, a communication control section 12, a host interface 14, and a system bus 15.

In FIG. 1, the CPU 2 controls the entire apparatus, employing the RAM 4 as the operation area, in accordance with a control program stored in the ROM 3. The ROM 3 is a read-only memory (ROM), in which program code is stored for controlling the respective parts of the apparatus by use of the CPU 2, font data, or other static data. The RAM 4 is a random access memory (RAM) serving as a temporary storage location employed as the working area of the CPU 2. The NVRAM 5 is a memory for storing nonvolatile data.

The panel control section 6 administers the interface with the user via the operation panel 7. The engine control section 8 and the scan print engine 9 are the units for realizing the scanner/plotter functions of reading out a paper manuscript and printing on recording paper. The disc driver 10 and the memorizing apparatus 11 are employed as the storage locations for amassing a large volume of image information and storing it in a database.

The communication control section 12 is connected to a network 30 such as an ethernet and enables communication with external devices such as a personal computer (PC) 21 on the network 30. A MODEM 13 is connected with a telephone circuit and enables communication with an external device on a public line. The host interface 14 enables communication with an external device, such as PC 20, etc., by use of the interface such as a centronics interface, an RS-232C interface, etc.

Figure 2:
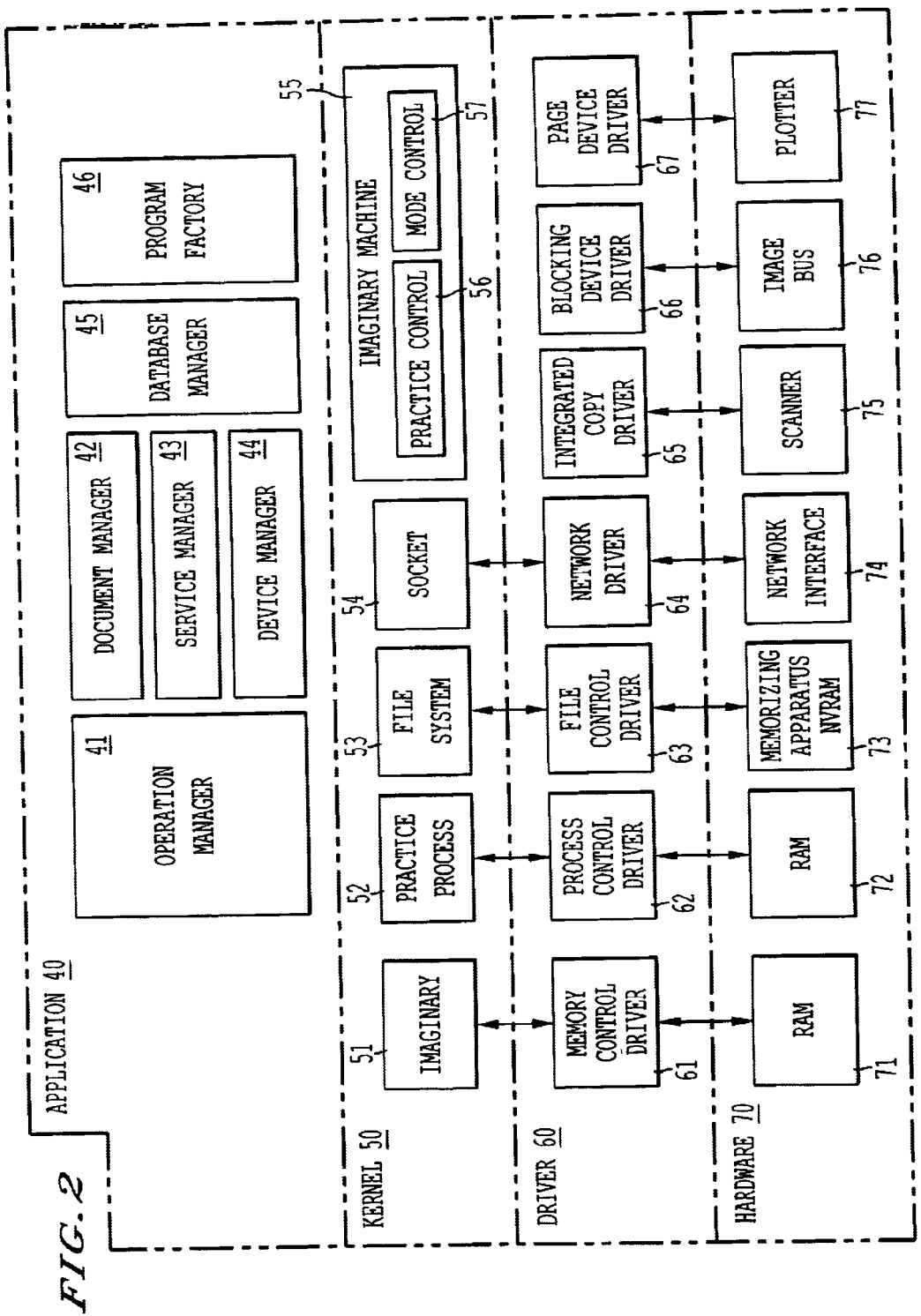
FIG. 2 is an explanatory diagram illustrating the relationship between the software and hardware of an image information inputting/outputting apparatus to which the user interface of the present invention can be applied.

FIG. 2 illustrates the relationship between the assembling software and hardware of the interior of the image information inputting/outputting apparatus 1. In FIG. 2, the software includes an application layer 40, a kernel layer 50 formed under the application layer 40, and a driver layer 60. A hardware layer 70 is located at the place under the driver layer 60.

The application layer 40 is the layer for forming an application function, such as copier, facsimile, and printer, etc. The document manager 42 is an important functional block of the application layer for handling the document in accordance with the desired function of the copier, facsimile, and printer.

The service manager 43 serves as a functional block and is commonly run when the document is handled and controls and practices various types of services. The device manager 44 serves as a functional block for determining the operation of a physical device (such as a scanner, plotter, or image bus) and controls and executes various sorts of services. The operation manager 41 controls the operation panel 7 attached to the apparatus and performs the notification of the button display and the notifying alert of the button operation. The database manager 45 maintains and controls permanent data such as utilization career data and imposed money data of the font-predetermined form-facsimile receiving career apparatus.

The program factory 46 performs initialization for practicing the program from the software assembling list, the software parts, and the interchangeability list thereof performs the initialization for practicing the program. Namely, the software parts statically existing in the RAM 3 are developed onto the RAM 4. The instance in the object-directing program is created. By receiving some messages, namely, by calling the method in the object-directing programming, the apparatus is put in an operable state.

The kernel layer 50 is the layer usually assembled as an ordinary OS kernel, abstracts various types of devices, and services the application layer 40. The kernel layer 50 in FIG. 2 includes imaginary 51, practice process 52, file system 53, socket 54, and imaginary machine 55, which includes practice control 56 and mode control 57. The application layer 40 operates by sending the system call to the kernel layer 50.

The driver layer 60 is a group of the functional blocks practicing the control for driving various sorts of hardware, for example, a memory control driver 61, a process control driver 62, a file control driver 63, a network driver 64, an integrated copy driver 65, a blocking device driver 66, and a page device driver 67. The hardware layer 70 is a group of the controllable resources existing in the apparatus, for example, a RAM 71, a RAM 72, an NVRAM functioning as a memorizing apparatus 73, a network interface 74, a scanner 75, an image bus 76, and a plotter 77.

Figure 3:
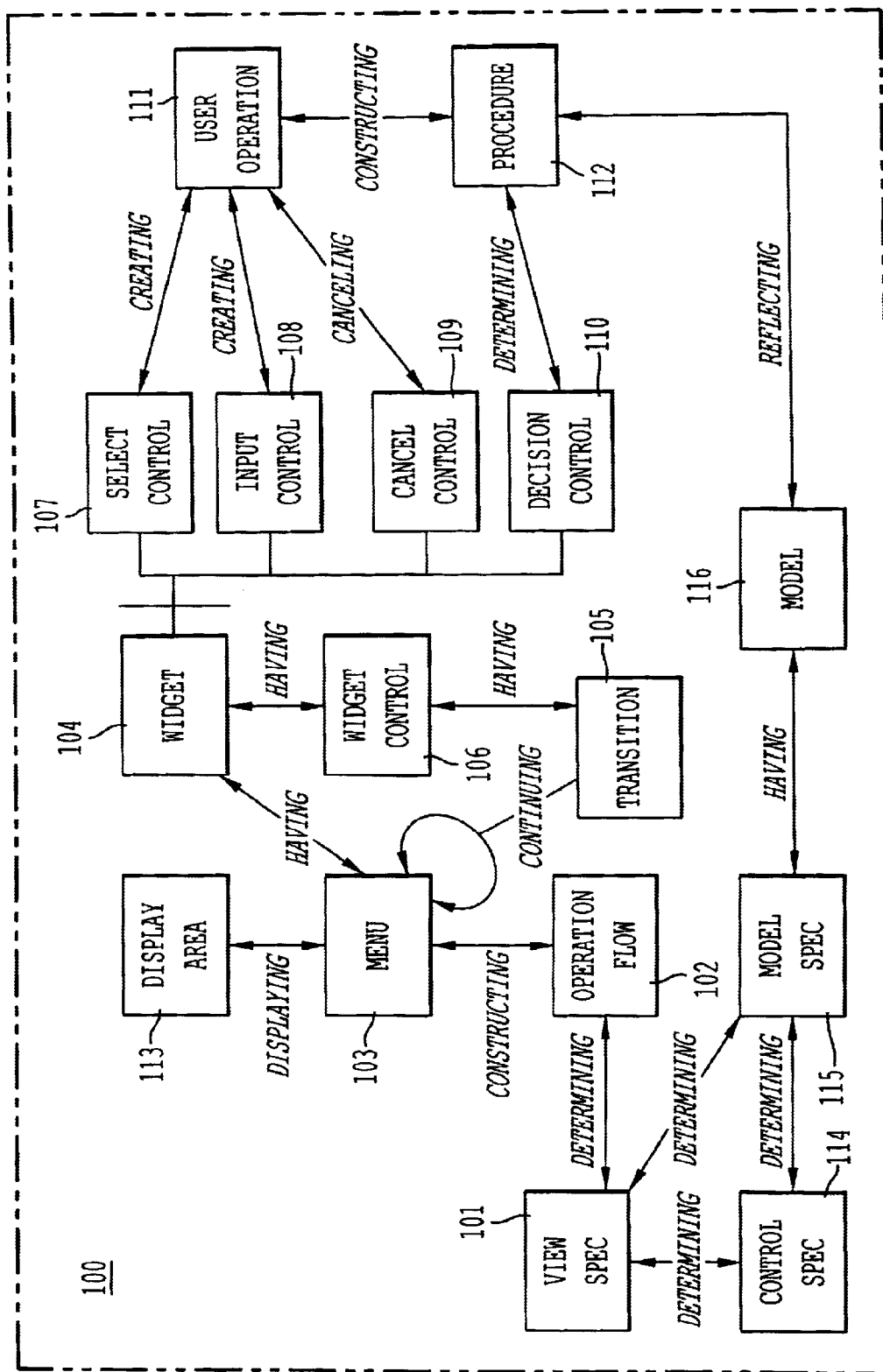
FIG. 3 is an explanatory diagram illustrating the relationship between the different software objects of the user interface of the present invention.
Figure 4:
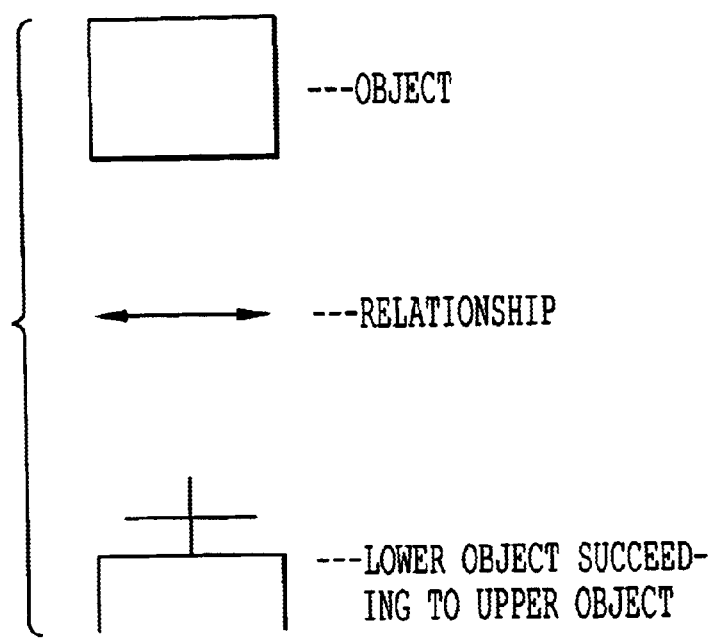
FIG. 4 is an explanatory diagram illustrating the meaning of and the relationship between the software objects shown in FIG. 3.

FIG. 3 illustrates an exemplary group of software objects 100 within the user interface system. The expressions and meanings of the respective objects and the relationship between the objects are shown in FIG. 4.

The software objects 100 within the user interface, as shown in FIG. 3, include the respective objects of View_Spec 101, Operation_Flow 102, Menu 103, Widget 104, Transition 105, Widget_Control 106, Select_Control 107, Input Control 108, Cancel_Control 109, Decision_Control 110, User_Operation 111, Procedure 112, Display_Area 113, Control_Spec 114, Model_Spec 115, and Model 116. The relationship between the respective objects is as shown in FIG. 4.

The software objects 100 within the user interface includes a menu flow object constructed with View_Spec 101, Operation_Flow 102, Menu 103, Widget 104, and Transition 105, and an operation part constructed with Widget_Control 106, Select_Control 107, Input_Control 108, Cancel_Control 109, Decision_Control 110, User_Operation 111, and Procedure 112.

The menu flow object constructed with the respective objects of View_Spec 101, Operation_Flow 102, Menu 103, Widget 104, and Transition 105, which is separated into a flow information part constructed with View_Spec 101, Operation_Flow 102, Menu 103, and Widget 104, and a flow control part constructed with Transition 105.

The operation part is constructed with Widget_Control 106, Select_Control 107, Input_Control 108, Cancel_Control 109, Decision_Control 110, User_Operation 111, and Procedure 112 is separated into an information memorizing object constructed with User_Operation 111, and Procedure 112, and an operation controlling object is constructed with Widget_Control 106, Select_Control 107, Input_Control 108, Cancel_Control 109, and Decision_Control 110.

The manner in which the system information is changed by the user operation and the image surface is transferred is described hereinafter. At the time of initializing the system, the View_Spec object 101 respectively creates the respective objects of the Operation_Flow 102, the Menu 103, the Widget 104, and the Transition object 105 and correlates the respective objects in accordance with the number of the menu for constructing the menu flow and the structure of transferring between the menus, both of which are previously determined. When the key event occurs by the user's operation, the object of Widget_Control 106 gives an order of operation to either one of the Select_Control 107, the Input_Control 108, the Cancel_Control 109, the Decision_Control 110 in order to perform any of the operations of corresponding selection, inputting, canceling, and determining.

When the operation of selecting/inputting is done, the User_Operation object 111 is created and the content thereof is stored in memory. When the operation of canceling is performed, the User_Operation object 111 is eliminated, and thereby, the cancellation of the operation is performed. Furthermore, when the operation of determining is done, the Procedure object 112 changes the system information as the procedure of the operation for the user to treat the collection of the User_Operation object 111.

In such way, according to the embodiment of the present invention, the software objects 100 in the circumference of the user interface is divided into menu flow objects and operation objects, and thereby, the operational control step can be divided into the control of the menu displaying construction and the control of the operation input. Consequently, it turns out to be possible to narrow to a limited area the variable part of the software in connection with the operation and display construction.

Furthermore, the menu flow object is separated into the flow information object, capturing the transferring of the menu as the static information, and the flow control object deciding the menu transferring in accordance with the operation of selecting the menu. Thereby, when the image surface construction and SPEC (Specification) of the image surface transferring are determined, the specification is only practically mounted (adopted) as the View_Spec 101. As a result, it is possible to realize a desired user interface control. In addition, the mechanism of the image surface transferring can be easily reused.

Furthermore, by separating the operation objects into the operation information memorizing objects for memorizing the contents of the operation and the operation controlling objects for registering/changing/deleting, the change of the system information by the user's can be treated with a common method that does not depend on the particular type of system information.

Moreover, although the user interface has been explained as being applied to an image information inputting/outputting apparatus, the application of the user interface of the present invention is not limited to such an apparatus.

This invention may be conveniently implemented using a digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a computer readable storage medium including instructions which can be used to program a computer to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

As is apparent from the foregoing description, the present invention demonstrates superior functional effects as mentioned hereinafter.

According to the first aspect of the invention, it turns out to be possible to separate the control of the menu displaying structure and the control of the inputting operation from each other and to localize further the variable portions of the software relating to the operation and the display structure.

Consequently, by separating, as a whole, the software objects into the controlling object and the controlling method, the efficiency of the re-utilization of the user interface apparatus can be improved. Also, maintenance of the software can be easily performed. For this reason, the load of the software research-and-development (R&D) engineers can be reduced, and therefore, the R&D efficiency can be considerably raised.

According to the second aspect of the invention, the menu flow controlling objects are separated into the software objects for grasping the transition of the menu as the static information and the software objects for determining the transition of the menu in accordance with the menu selecting operation. Thereby, the mechanism of the image surface transition can be easily utilized.

Namely, if the specifications of the image surface construction and the image surface transition are decided, the desired user interface control can be realized only by respectively embodying the specifications of both. For this reason, the load of the software research-and-development (R&D) engineers can be reduced, and therefore, the R&D efficiency can be considerably raised.

According to the third aspect of the invention, the aforementioned operation objects are separated into the software objects for memorizing the contents of the operation and the software objects for registering/changing/deleting the inputted operation. Thereby, if a user changes the system information, the change can be performed with a common method that does not depend on the types of system information.

As a result, even though the number of different types of system information may increase, the mechanism thereof, as it is can be applied to the purposes, is improved. Additionally, the efficiency of the re-utilization of the user interface apparatus can be improved. For this reason, the load of the software research-and-development (R&D) engineers can be reduced, and therefore, the R&D efficiency can be considerably raised.

Obviously, numerous modifications and variations of the present invention are possible in light of the above teachings. It is therefore to be understood that within the scope of the appended claims, the invention may be practiced otherwise than as specifically described herein.

Having now fully described the invention, it will be apparent to one of ordinary skill in the art that many changes and modifications can be made thereto without departing from the spirit and scope of the invention as set forth herein. This application is based on Japanese Patent Application No. JPAP10-229037, filed on Aug. 13, 1998. The entire contents of Japanese Patent Application No. JPAP10-229037 are incorporated herein by reference.

What is claimed is:

1. A user interface system, for displaying an operation menu and transferring contents of said operation menu based on an operation input received in response to the operation menu being selected, comprising:

a processor configured to execute a process requirement corresponding to the operation input;

a group of independent software objects configured to display the operation menu and to transfer the contents of said operation menu in response to the operation menu being selected, said group of independent software objects including:

a menu flow software object configured to control the transfer of the contents of the operation menu and to manage menu display layout; and an operation software object separate from the menu flow software object and functioning in cooperation with the menu flow software object to control processing of the operation input by the processor;

wherein the operation software object comprises:

an operational information memorizing object configured to store contents of the operation software object; and an operation controlling object separate from the operational information memorizing object and functioning in cooperation with the operational information memorizing object to create, change, and delete the input operation.

2. The user interface system of claim 1, wherein the menu flow software object comprises:

a flow information object configured to capture and transfer said contents of the operation menu as static information; and a flow control object configured to transfer the operation menu based on the operation input, said flow control object being separate from said flow information object and functioning in cooperation with said flow information object.

3. A computer program product, comprising:

a computer storage medium and a computer program code mechanism embedded in the computer storage medium for causing a computer to generate a user interface for displaying an operation menu and transferring the contents of said operation menu based on an operation input received in response to the operation menu being selected, the computer program code mechanism comprising:

a first computer code device configured to display the operation menu and to transfer the contents of said operation menu in response to the operation menu being selected, said first computer code device including:

a second computer code device configured to control the transfer of the operation menu and to manage menu display layout; and a third computer code device configured to control processing of the operation input, the second and third computer code devices respectively embodying separate software objects functioning in cooperation with each other;

wherein the third computer code device comprises:

an operational information memorizing object configured to store contents of an operation software object; and an operation controlling object configured to create, change, and delete the input operation, said operation controlling object being separate from the operational information memorizing object and functioning in cooperation with the operational information memorizing object.

4. The computer program product of claim 3, wherein the second computer code device comprises:

a flow information object configured to capture and transfer said operation menu as static information; and a flow control object configured to transfer the operation menu based on the operation input, said flow control object being separate from said flow information object and functioning in cooperation with said flow information object.

5. A method for processing an input with a user interface, comprising the steps of:

displaying an operational menu and transferring contents of said operation menu based on an operation input received in response to the operation menu being selected, using plural software objects;

controlling the transfer of the operation menu and managing menu display layout using a menu flow software object;

controlling processing of the operation input using an operation software object, the operation software object being separated from the menu flow software object and functioning in cooperation with the menu flow software object; and executing a requirement process corresponding to the operation input;

wherein the step of controlling processing of the operation input comprises the steps of:

storing contents of the operation software object using an operational information memorizing object; and creating, changing, and deleting the input operation using an operation controlling object, said operation controlling object being separate from the operational information memorizing object and functioning in cooperation with the operational information memorizing object.

6. The method of claim 5, wherein the step of controlling the transfer of the operation menu comprises the steps of:

capturing and transferring the operation menu as static information, using a flow information object; and transferring the operation menu based on the operation input, using a flow control object, said flow control object being separate from said flow information object and functioning in cooperation with said flow information object.

7. A computer readable medium containing program instructions for execution on a computer system, which when executed by a computer, cause the computer to perform the steps of:

displaying an operation menu and transferring the contents of said operation menu based on an operation input received in response to the operation menu being selected, using plural software objects;

controlling the transfer of the operation menu with a menu flow software object;

controlling processing of the operation input using an operation software object, the operation software object being separate from the menu flow software object and functioning in cooperation with the menu flow software object; and executing a requirement process corresponding to the operation input;

wherein the step of controlling processing of the operations input comprises the steps of:

storing contents of the operation software object, using an operational information memorizing object; and creating, changing, and deleting the input operation using an operation controlling object, said operation controlling object being separate from the operational information memorizing object and functioning in cooperation with the operational information memorizing object.

8. The computer readable medium of claim 7, wherein the step of controlling the transfer of the operation menu comprises the steps of:

capturing and transferring the operation menu as static information using a flow information object; and transferring the operation menu based on the operation input, using a flow control object, said flow control object being separate from said flow information object and functioning in cooperation with said flow information object.

* * * * *